(12) United States Patent
Nagai et al.

(10) Patent No.: US 7,601,198 B2
(45) Date of Patent: Oct. 13, 2009

(54) METHOD FOR PRODUCING AMMONIUM HEXACHLORORUTHENATE AND RUTHENIUM POWDER, AS WELL AS AMMONIUM HEXACHLORORUTHENATE

(75) Inventors: Hifumi Nagai, Ooita (JP); Yuji Kawano, Ooita (JP)

(73) Assignee: Nippon Mining & Metals Co., Ltd., Tokyo (JP)

( * ) Notice: Subject to any disclaimer, the term of this patent is extended or adjusted under 35 U.S.C. 154(b) by 0 days.

(21) Appl. No.: 12/010,616

(22) Filed: Jan. 28, 2008

(65) Prior Publication Data

US 2008/0199386 A1 Aug. 21, 2008

(30) Foreign Application Priority Data

Jan. 29, 2007 (JP) ............................. 2007-017605
Dec. 11, 2007 (JP) ............................. 2007-319383

(51) Int. Cl.
*C01G 55/00* (2006.01)
*C01C 1/28* (2006.01)
*B22F 9/00* (2006.01)

(52) U.S. Cl. ............................. 75/354; 75/343; 75/357; 75/363; 423/462; 423/463

(58) Field of Classification Search ................. 423/462, 423/463; 75/235, 354, 357, 363, 245, 343
See application file for complete search history.

(56) References Cited

U.S. PATENT DOCUMENTS 4,002,470 A * 1/1977 Isa et al. ........................ 75/421
4,091,082 A * 5/1978 Gessell et al. ............... 423/413
6,036,741 A * 3/2000 Shindo et al. ............... 75/10.28

FOREIGN PATENT DOCUMENTS

| JP | 2007046090 A | * | 2/2007 |
| JP | 2007230802 A | * | 9/2007 |
| SU | 469665 A | * | 7/1975 |

OTHER PUBLICATIONS

Perry, John H. et al, "Chemical Engineer's Handbook," 4th edition, 1963 (no month), pp. 17-7 to 17-15.*

* cited by examiner

*Primary Examiner*—Ngoc-Yen M Nguyen
(74) *Attorney, Agent, or Firm*—Birch, Stewart, Kolasch & Birch, LLP

(57) ABSTRACT

Ammonium hexachlororuthenate is produced by adding ammonium chloride to a hydrochloric acid solution containing ruthenium. The ammonium hexachlororuthenate is baked to obtain the ruthenium powder. When the moisture content of the ammonium hexachlororuthenate is high, the baked product is so hard sintered product that its pulverization is not easy. In accordance with the present invention, the following steps are carried out. Hydrochloric acid solution containing ruthenium is held at a temperature of 80 to 95° C. for three hours or longer. The ammonium chloride is then added to the hydrochloric acid solution which is stirred by a stirring mill at the rotation of 200 revolutions per minute or more. The hydrochloric acid solution is held at a temperature of from 85 to 95° C. for 1 hour while being stirred at 200 rpm. The resultant precipitate of ammonium hexachlororuthenate is filtered. The inventive crystals of precipitated ammonium hexachlororuthenate has 10 mass % or less of moisture content.

3 Claims, 1 Drawing Sheet

METHOD FOR PRODUCING AMMONIUM HEXACHLORORUTHENATE AND RUTHENIUM POWDER, AS WELL AS AMMONIUM HEXACHLORORUTHENATE

BACKGROUND OF INVENTION

1. Field of Invention

The present invention relates to a method for producing ammonium hexachlororuthenate by way of precipitation from a hydrochloric acid solution containing ruthenium, a method for producing ruthenium powder, as well as ammonium hexachlororuthenate.

2. Description of Related Art

Ruthenium powder can be produced by adding ammonium chloride to a hydrochloric acid solution containing ruthenium, heating the solution so as to form ammonium hexachlororuthenate $(NH_4)_3[RuCl_6]$, precipitating and filtering it, and baking the precipitated crystals in reducing atmosphere.

Patent Document 1 (Japanese Unexamined Patent Publication (kokai) No. 2007-230802) proposes a method for producing crystals of precipitated ruthenium. According to the disclosed condition for forming ammonium hexachlororuthenate, a hydrochloric acid solution containing ruthenium is held at from 80 to 95° C. for 3 hours or longer, ammonium chloride is added to the solution held as mentioned above, and the temperature of from 80 to 95° C. is maintained for 1 hour or longer. The moisture content of the precipitated crystals of ammonium hexachlororuthenate is 16.1% or more according to the examples of Patent Document 1.

Since the ruthenium obtained by baking the ammonium hexachlororuthenate is hard sintered product, pulverization thereof is not easy. The ruthenium powder is liable to be contaminated by worn parts of a pulverizing mill. Patent Document 2 (Japanese Patent No. 3990417) proposes a method for producing a ruthenium powder which is easy to pulverize. According to the proposed method, ammonium hexachlororuthenate $(NH_4)_3[RuCl_6]$ is baked at 500 to 800° C. to produce crude ruthenium powder. This is pulverized and then re-baked at 800 to 1000° C. The proposed two-stage baking method enables to obtain a sintered product which is less hard.

DISCLOSURE OF INVENTION

It is important in the two-stage baking method to thoroughly pulverize the crude ruthenium, which is obtained by baking at 500 to 800° C. in the first sintering stage. If the pulverizing property of crude ruthenium is improved, the two stage baking method enables to ruthenium powder to be easily obtained. The pulverizing property of crude ruthenium is dependent upon the properties of ammonium hexachlororuthenate. Novel ammonium hexachlororuthenate is to be provided to improve the pulverizing property of the crude ruthenium.

As is described hereinabove, the prior art could not drastically decrease the moisture content of ammonium hexachlororuthenate to a level that does not detrimentally influence the pulverizing property of precipitated hexachlororuthenate crystals.

It is therefore an object of the present invention to decrease the moisture content of ammonium hexachlororuthenate.

It is another object of the present invention to provide crystals of precipitated ammonium hexachlororuthenate having low moisture content.

It a further object of the present invention to provide a method for easily producing ruthenium powder having improved pulverizing property.

The present inventors have carefully studied the relationship between the properties of ammonium hexachlororuthenate and the pulverizing property of crude ruthenium, which is obtained by baking the ammonium hexachlororuthenate. The present inventors discovered that the pulverizing property of ruthenium powder is improved by means of decreasing the moisture content of ammonium hexachlororuthenate. Incidentally, chlorine atoms and the ruthenium atoms of ammonium hexachlororuthenate form a coordinate bond. Some of the chlorine atoms are replaced with the water molecules, thereby forming an aqua complex. It has now been discovered that the moisture content of ammonium hexachlororuthenate can be decreased to a level lower than the prior art by means of decreasing the quantity of aqua complex. It has also been discovered that vigorous stirring during addition of ammonium chloride to form ammonium hexachlororuthenate is effective for decreasing the moisture content.

Since the aqua complex includes water molecules, it has high affinity with water and increases the moisture content of ammonium hexachlororuthenate. Formation of a salt containing the aqua complex can be effectively suppressed by appropriately controlling the temperature condition of a process, in which the ammonium chloride is added to a hydrochloric acid solution containing the hexachlororuthenic acid in order to form the ammonium hexachlororuthenate.

Ammonium chloride is added to the hydrochloric acid solution containing ruthenium, crystals of precipitated ammonium hexachlororuthenate in such hydrochloric acid solution. Generation of crystal nuclei is promoted and fine crystals precipitate when the solution mentioned above is stirred vigorously, yielding ammonium hexachlororuthenate crystals. As a result, incorporation of water into the crystals is reduced and hence the moisture content of ammonium hexachlororuthenate can be lessened.

In accordance with the objects of the present invention, there is provided a method for producing ammonium hexachlororuthenate, in which ammonium chloride is added to a hydrochloric acid solution of ruthenium to thereby form an ammonium hexachlororuthenate, characterized in that the hydrochloric acid solution containing ruthenium is held at a temperature of 80 to 95° C. for three hours or longer, the ammonium chloride is then added to the hydrochloric acid solution which is stirred by a stirring mill at the rotation of 200 revolutions per minute or more, the hydrochloric acid solution is held at a temperature of from 85 to 95° C. for 1 hour while being stirred at 200 rpm (revolution per minute) or more, and, the resultant precipitate of ammonium hexachlororuthenate is filtered, thereby obtaining crystals of precipitated ammonium hexachlororuthenate having 10 mass % or less of moisture content.

There is also provided a method for producing ruthenium powder, characterized in that the crystals of precipitated ruthenium powder is baked to form a crude ruthenium powder, the crude ruthenium powder is pulverized, and then, the pulverized crude ruthenium powder is again baked.

There is further provided crystals of precipitated ammonium hexachlororuthenate having 10 mass % or less of moisture content.

The aqua ions, water of crystallization and adhered water are collectively referred to as the moisture of "moisture content" herein. The moisture content is measured by the following method. The weight of ammonium hexachlororuthenate obtained as the filtered solid matter by the method described hereinabove (hereinafter referred to as "the crystals of precipitated ruthenium") is measured. This weight is hereinafter referred to as "the weight of crystals of precipitated ruthenium". The crystals of precipitated ruthenium is placed in a vessel made of alumina, quartz, heat-resistant glass or the like and is then baked at 600° C. in the mixed gas of 5 vol % of hydrogen and argon so as to form elementary ruthenium and its weight is measured. The weight of elementary ruthenium is converted to the theoretical weight of ammonium hexachlororuthenate, with the proviso that the crystals of precipitated ruthenium totally consists of ammonium hexachlororuthenate $(NH_4)_3[RuCl_6]$. The difference of the theoretical amount and the actual weight of crystals of precipitated ruthenium is calculated, and is employed as the weight of the "moisture". The moisture content is therefore moisture/crystals of precipitated ruthenium.

The crystals of ammonium hexachlororuthenate is precipitated from a hydrochloric acid solution containing ruthenium and is $(NH_4)_3[RuCl_6]$ crystals, which contain the aqua ions, water of crystallization and adhered water.

The crystals of precipitated ruthenium (ammonium hexachlororuthenate) obtained by the method of the present invention has a low moisture content. The ruthenium obtained by baking the thus-obtained crystals of precipitated ruthenium has improved pulverizing property. The production of ruthenium powder can therefore be facilitated.

DESCRIPTION OF PREFERRED EMBODIMENTS

The present invention is hereinafter described first with regard to the ammonium hexachlororuthenate and its production method.

In the present invention, the moisture content of the crystals of precipitated ruthenium produced in the hydrochloric acid solution containing ruthenium is low. The crystals of precipitated ruthenium is then baked to produce the ruthenium powder. The pulverizing property of the post-baked powder can be improved by decreasing the moisture content of the crystals of precipitated ruthenium. The crystals of precipitated ruthenium has such a composition that the aqua complex having high affinity with water is very low. The quantity of water incorporated into such crystals of precipitated ruthenium is, therefore, very low.

The hydrochloric acid solution containing ruthenium can be provided by means of adding sodium bromate serving as oxidizing agent into an aqueous solution containing ruthenium, heating the solution to 80° C., and incorporating ruthenium tetraoxide, which is volatile, into an aqueous solution containing 8.4 mol/L of hydrochloric acid. The resultant hydrochloric acid solution containing ruthenium contains hexachlororuthenate ions $[RuCl_6]^{3-}$ and also a compound expressed by $[RuCl_{6-n}(H_2O)_n]$, in which a part of the chloro coordinate is changed to the aqua complex. Mole number of the aqua ions is expressed by n and is 1 or 2. The aqua complex is therefore expressed by $(NH_4)_{n-3}[RuCl_{6-n}(H_2O)]$. An equilibrium relationship between the hexachlororuthenate ions $[RuCl_6a]^3$ and $[RuCl_{6-n}(H_2O)_n]^m$ ions, in which some of the coordinated chlorine atoms are converted to the aqua complex, is established in the hydrochloric acid solution, containing ruthenium. The ionic valence "m" of the latter ions is $-2$ at $n=1$ and is $-1$ at $n=2$. When the hydrochloric acid solution containing ruthenium is held at a temperature of from 80 to 95° C., an equilibrium between the hexachlororuthenate ions $[RuCl_6]^{3-}$ and $[RuCl_{6-n}(H_2O)_n a]^m$ ions, in which some of the chloro coordinate is changed to the aqua complex, is changed such that the relative proportion of the former ions to the latter ions is more decreased as the temperature is higher. As a result, the amount of water of crystallization in the crystals of precipitated ruthenium is lessened. When the temperature is higher than 90° C., water vaporizes so vigorously that it is impossible to carry out the crystallization process. Since the $[RuCl_{6-n}(H_2O)_n a]^m$ converts to $[RuCl_6]^{3-}$ slowly, the temperature of from 80 to 95° C. is held for 3 hours or longer so as to thoroughly convert the former ions to the latter ions and hence to increase the amount of $[RuCl_6]^{3-}$ formed. The amount of water of crystallization can therefore be decreased.

$[RuCl_6]^{3-}$ can be effectively formed in the hydrochloric acid solution containing ruthenium under the presence of excess chloride ions. The amount of hydrochloric acid is not particularly limited but is preferably 2 equivalents or more relative to the ruthenium which participates in the formation reaction of one mol of hexachlororuthenate. When the hydrochloric acid is insufficient for the preferable equivalent, it is replenished before heating to a temperature of from 80 to 95° C.

The hydrochloric acid solution of ruthenium, which has been held at temperature of from 80 to 95° C. for 3 hours or more, is stirred in a stirring mill at a revolution of 200 rpm (revolution per minute) or more. During the stirring, the ammonium chloride is added to the hydrochloric acid solution, which is maintained at a temperature of from 80 to 95° C. Stirring is further continued while maintaining the temperature of 80 to 95° C. for 1 hour or more so as to precipitate the ammonium hexachlororuthenate crystals. The hydrochloric acid solution is then allowed to cool and is subjected to filtration so as to separate the precipitated crystals of ammonium hexachlororuthenate. When the ammonium chloride is added to the hydrochloric acid solution, its temperature may fall and the chloro-aqua complex, i.e., $[RuCl_{6-n}(H_2O)_n]^m$ may be disadvantageously formed. The ammonium chloride must therefore be carefully added so as not to lower the temperature less than 80° C.

When the ammonium chloride is caused to react with the aqua complex $[RuCl_{6-n}(H_2O)_n]^m$, the resultant salt precipitated contains the aqua complex and hence is in the form of $(NH_4)_3[RuCl_{6-n}(H_2O)_n]$. However, the reaction conditions are changed by maintaining the temperature in a range of from 85 to 95° C. and adding the ammonium chloride to the solution, the temperature of which is being maintained. In this case, ammonium hexachlororuthenate is formed but $[RuCl_{6-n}(H_2O)_n]^m$ is not formed.

In addition, the ammonium hexachlororuthenate is satisfactorily formed and is effectively recovered by means of holding the temperature of from 85 to 95° C. for 1 hour or more after addition of ammonium chloride. No particular limitation is imposed on the amount of ammonium chloride added but the amount is preferably from 1.5 to 3 equivalents relative to the ruthenium amount, which participates in the formation reaction of one mol of ammonium hexachlororuthenate. When the amount of ammonium chloride added is very low, the ammonium hexachlororuthenate is not formed satisfactorily and the recovering ratio becomes low. When the amount of ammonium chloride added is very high, the ammonium chloride unreacted may precipitate.

It is necessary to decrease the amount of water incorporated into ammonium hexachlororuthenate crystals, in order to form the crystals of precipitated ruthenium having low moisture content. In order to decrease the amount of water incorporated, ammonium hexachlororuthenate crystals should be allowed to precipitate while the solution is stirred at 200 revolutions per minute or more by means of a stirring mill and further the ammonium chloride is added to the stirred solution. Vigorous stirring increases generation of crystal nuclei and hence decreases the amount of water to be incorporated into the growing crystals. It has been discovered as a result of experiments that the following conditions are necessary for decreasing the moisture content of ammonium hexachlororuthenate. First, the revolution number of stirring mill should be 200 revolution per minute or more. Second, ammonium chloride should be added during the stirring. Third, temperature should be controlled to fall between 85 to 95° C., and stirring should be continued at 200 revolutions per minute or more for 1 hour or more. Although no particular limitation is imposed on the upper limit of a stirring mill, the revolutions of 300 revolutions per minute or more is not particularly meaningful.

A method for producing the ruthenium powder according to the present invention is described hereinafter.

When the conventional ammonium hexachlororuthenate having high moisture content is baked at high temperature, the resultant ruthenium is hard sintered product. Subsequent pulverizing in a pulverizing mill is not easy, and in turn the ruthenium powder is contaminated by the worn particles of the pulverizing mill. Meanwhile, when the conventional ammonium hexachlororuthenate is baked at low temperature, no difficulty will be involved in the pulverizing at all. However, since salt will not be satisfactorily decomposed, the post-baked ruthenium powder will contain a large amount of oxygen and chlorine and hence will be of low purity.

The crystals of precipitated ruthenium (ammonium hexachlororuthenate) formed by the method as described hereinabove has 10 mass % or less of moisture content. This crystals of precipitated ruthenium is baked and the resultant crude powder is pulverized. The resultant crude ruthenium powder is again baked, and the ruthenium powder is obtained.

The ammonium hexachlororuthenate according to the present invention is baked at low temperature so as to remove most of the ammonium chloride and the moisture. The post-baked crude ruthenium powder is again baked at a higher temperature. The remaining ammonium chloride and moisture are further decreased in the second baking. The resultant product is not a hard sintered product. Ruthenium powder having high purity can be easily obtained by the method of the present invention.

Preferably, the baking temperature of the first stage is from 500 to 800° C. In the second baking stage, the baking temperature is preferably from 800 to 1000° C. Since ruthenium is liable to be oxidized, the protective atmosphere of baking is preferably reducing and contains hydrogen. It is possible to easily produce a ruthenium powder having improved pulverizing property.

The present invention is hereinafter described with reference to the examples.

EXAMPLES

Example 1

Figure 1:
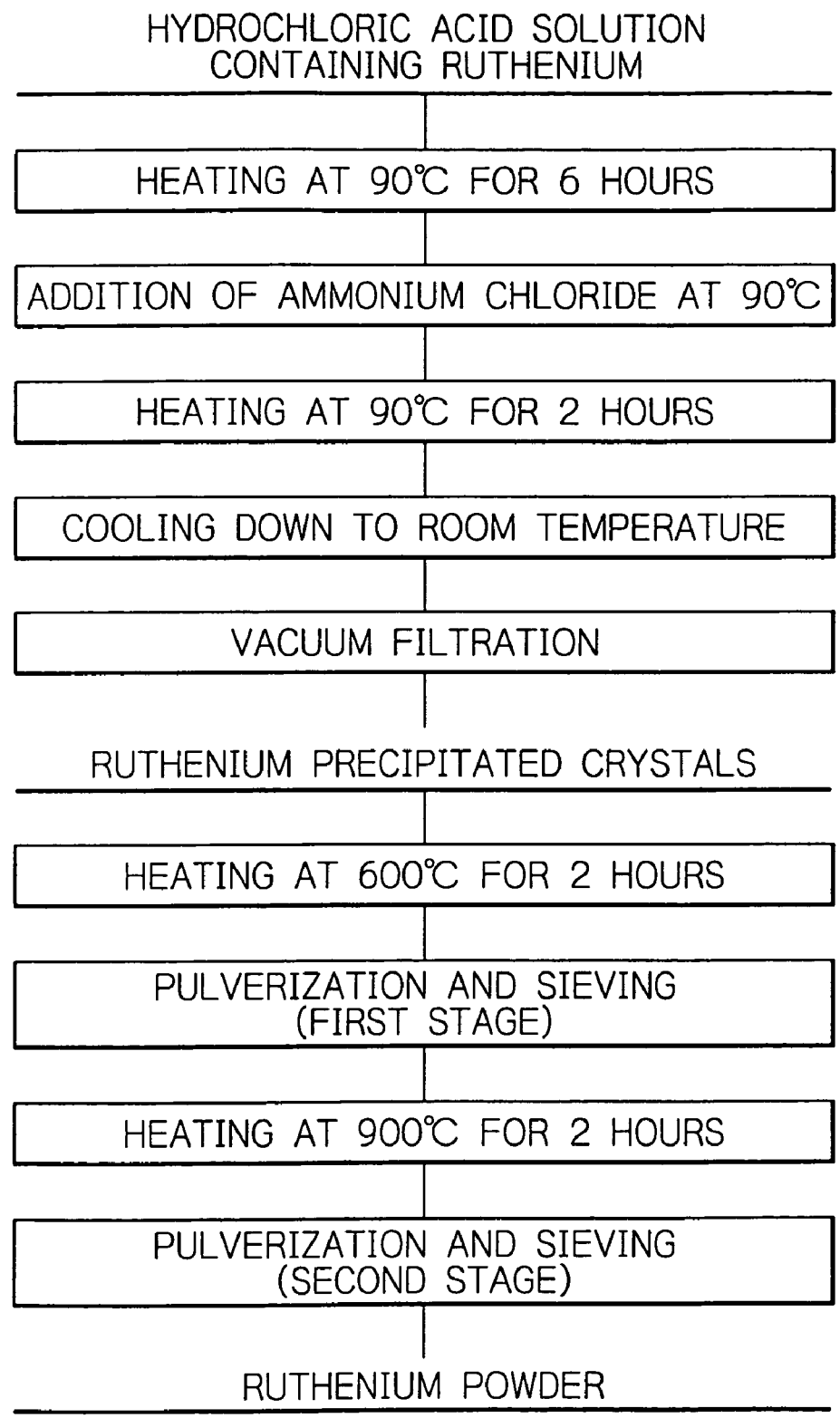
FIG. 1 is a flow sheet of an example of the present invention.

Referring to FIG. 1, the process according to an example is illustrated. In Table 1, the experimental conditions of the inventive examples and the comparative examples are shown. In Table 2, the experimental results of the inventive examples and comparative examples are shown.

The sludge of copper electrolysis was subjected to the chloridizing vaporization in the chlorine atmosphere. The so-treated sludge, to which sodium chloride was added, was subjected to chloridizing roasting to convert the platinum-group metal to the soluble salt. The roasted material was dissolved in water. Sodium bromate was added to the resultant aqueous solution to oxidize the ruthenium to volatile ruthenium tetraoxide. The ruthenium tetraoxide was distilled and was dissolved in a solution containing 8.4 mol/L of hydrochloric acid. Ruthenium was recovered in the aqueous solution containing hydrochloric acid.

A 140 liters of hydrochloric acid solution, which contained 50 g/L of ruthenium, was heated to 90° C. for 6 hours, and was then stirred with a stirring mill rotated at 300 revolutions per minute. While the hydrochloric acid solution was stirred and kept at the temperature of 90° C., 2.8 equivalents of ammonium chloride, the amount necessary to convert the ruthenium to ammonium hexachlororuthenate, was added. The ammonium chloride was added drop wise so as not to lower the temperature of hydrochloric acid solution. After all the ammonium chloride was added as a whole, the temperature was maintained at 90° C. for 2 hours and the stirring was continued. The temperature was then allowed to cool to room temperature. Crystals of ammonium hexachlororuthenate precipitated and were subjected to filtering by means of a filtering press. The filtered and recovered ammonium hexachlororuthenate was in the form of blackish red powder. Its moisture content measured by the method described above was 4.5 mass %.

The filtered ammonium hexachlororuthenate was temporarily stored in a vessel made of heat resistant glass. Subsequently, the first baking stage was carried out at 600° C. for 2 hours using a tube furnace in a mixed gas atmosphere of 5 Vol % of hydrogen and argon. Crude ruthenium in the form of sponge was obtained. This was disintegrated with a disc mill (SPD-100 produced by MM Tech Co., Ltd.) and was then sieved by a sieve having 180 μm of apertures. 50g of the crude ruthenium could not be recovered by any reasons such as non-passage through the sieve. The pulverizing loss in the first baking stage was 0.7%. No clogging occurred in the disc mill, which exhibited improved pulverizing property.

The crude ruthenium, which passed through the 180 μm apertures of the sieve, was temporarily stored in a vessel made of high-purity alumina. Subsequently, the second baking stage was carried out at 900° C. for 2 hours using a tube furnace in the mixed gas atmosphere of 5 Vol % of hydrogen and argon. Ruthenium powder was obtained.

TABLE 1

| | No. | Concentration of Hydrochloric Acid | Heating Temperature Before Addition of $NH_4Cl$ | Heating Time Before Addition of $NH_4Cl$ | Addition Temperature of $NH_4Cl$ | Heating Temperature After Addition of $NH_4Cl$ | Heating Time After Addition of $NH_4Cl$ | Stirring Mill Revolution Number |
|---|---|---|---|---|---|---|---|---|
| Example | 1 | 8.4 | 90 | 6 | 90 | 90 | 2 | 300 |
| | 2 | 8.4 | 95 | 3 | 95 | 95 | 1 | 200 |

TABLE 1-continued

|  | No. | Concentration of Hydrochloric Acid | Heating Temperature Before Addition of NH₄Cl | Heating Time Before Addition of NH₄Cl | Addition Temperature of NH₄Cl | Heating Temperature After Addition of NH₄Cl | Heating Time After Addition of NH₄Cl | Stirring Mill Revolution Number |
|---|---|---|---|---|---|---|---|---|
|  | 3 | 8.4 | 85 | 6 | 85 | 85 | 2 | 400 |
|  | 4 | 8.4 | 80 | 6 | 80 | 90 | 2 | 300 |
| Comparative | 1 | 8.4 | 90 | 6 | 90 | 90 | 2 | 100 |
| Example | 2 | 8.4 | 70 | 6 | 70 | 70 | 2 | 300 |

TABLE 2

|  | No. | Moisture Content (%) | Color of Precipitated Crystal | Pulverizing Property (First Baking) | Pulverizing Loss (%) |
|---|---|---|---|---|---|
| Example | 1 | 4.5 | Blackish Red | ○ | 0.7 |
|  | 2 | 5.9 | Blackish Red | ○ | 1.1 |
|  | 3 | 8.9 | Blackish Red | ○ | 1.6 |
|  | 4 | 9.5 | Blackish Red | ○ | 1.9 |
| Comparative | 1 | 13.6 | Blackish Red | X | 2.2 |
| Example | 2 | 18.6 | Brown | X | 3.7 |

Example 2

Ammonium hexachlororuthenate was prepared by the same process as in Example 1 except that the hydrochloric acid solution containing 50 g/L of ruthenium was held at 95° C. for 3 hours, that the ammonium chloride was added to the solution at a temperature of 95° C.; and, the solution was maintained at this temperature and was stirred at 200 rpm for 1 hour. The filtered and recovered ammonium hexachlororuthenate was in the form of blackish red powder. Its moisture content was 5.9 mass %.

The resultant hexachlororuthenate was subjected to the first baking stage under the same conditions as in Example 1, was then disintegrated with a disc mill and was then sieved by a sieve having 180 μm of apertures. The crude copper, which was not recovered in the pulverizing stage for any reasons such as non passage through the apertures of a sieve, was 80 g. The pulverizing loss in the first baking stage was 1.1%. No clogging occurred in the disc mill, which exhibited improved pulverizing property.

The crude ruthenium, which passed through the 180 μm apertures of the sieve, was temporarily stored in a vessel made of high-purity alumina. Subsequently, the second baking stage was carried out at 900° C. for 2 hours using a tube furnace in the mixed gas atmosphere of 5 Vol % of hydrogen and argon. Ruthenium powder was obtained.

Example 3

Ammonium hexachlororuthenate was prepared by the same process as in Example 1 except that the hydrochloric acid solution containing 50 g/L of ruthenium was held at 85° C. for 6 hours, that the ammonium chloride was added at the solution at a temperature of 85° C.; and, the solution was maintained at this temperature and was stirred at 400 rpm for 2 hours. The filtered and recovered ammonium hexachlororuthenate was in the form of blackish red powder. Its moisture content measured by the method described above was 8.9 mass %.

The resultant hexachlororuthenate was subjected to the first baking stage under the same conditions as in Example 1, was then disintegrated with a disc mill and was then sieved by a sieve having 180 μm of apertures. The crude copper, which was not recovered in the pulverizing stage under any reasons such as non passage through the apertures of a sieve, was 110 g. The pulverizing loss in the first baking stage was 1.6%. No clogging occurred in the disc mill, which exhibited improved pulverizing property.

The crude ruthenium, which passed through the 180 μm apertures of the sieve, was temporarily stored in a vessel made of high-purity alumina. Subsequently, the second baking stage was carried out at 900° C. for 2 hours using a tube furnace in a mixed gas atmosphere of 5 Vol % of hydrogen and argon. Ruthenium powder was obtained.

Example 4

Ammonium hexachlororuthenate was prepared by the same process as in Example 1 except that the hydrochloric acid solution containing 50 g/L of ruthenium was held at 80° C. for 6 hours, that the ammonium chloride was added to the solution at a temperature of 80° C. and the temperature of solution was raised to and held at 90° C. for 2 hours. The filtered and recovered ammonium hexachlororuthenate was in the form of blackish red powder. Its moisture content measured by the method described above was 9.5 mass %.

The resultant hexachlororuthenate was subjected to the first baking stage under the same conditions as in Example 1, was then disintegrated with a disc mill and was then sieved by a sieve having 180 μm of apertures. The crude copper, which was not recovered in the pulverizing stage for any reasons such as non passage through the apertures of a sieve, was 130 g. The pulverizing loss in the first baking stage was 1.9%. No clogging occurred in the disc mill, which exhibited improved pulverizing property.

The crude ruthenium, which passed through the 180 μm apertures of the sieve, was temporarily stored in a vessel made of high-purity alumina. Subsequently, the second baking stage was carried out at 900° C. for 2 hours using a tube furnace in the mixed gas atmosphere of 5 Vol % of hydrogen and argon. Ruthenium powder was obtained.

Comparative Example 1

Ammonium hexachlororuthenate was prepared by the same process as in Example 1. Particularly, the hydrochloric acid solution contained 50 g/L of ruthenium, and the temperature was maintained after addition of ammonium chloride. However, the revolution was 100 rpm during the temperature maintenance. The filtered and recovered ammonium hexachlororuthenate was in the form of blackish red powder. Its moisture content was 13.6 mass %.

The resultant hexachlororuthenate was subjected to the first baking stage under the same conditions as in Example 1, was then disintegrated with a disc mill and was then sieved by a sieve having 180 μm of apertures. The crude ruthenium was liable to coagulate and the disc mill clogged due to the coagulated ruthenium. Crude ruthenium must be peeled from the disc mill. The pulverizing property was therefore poor. The crude ruthenium, which was not recovered in the pulverizing stage for any reasons such as non passage through the apertures of a sieve, was 155 g. The pulverizing loss in the first baking stage was 2.2%.

The crude ruthenium, which passed through the 180 μm apertures of the sieve, was temporarily stored in a vessel made of high-purity alumina. Subsequently, the second baking stage was carried out at 900° C. for 2 hours using a tube furnace in a mixed gas atmosphere of 5 Vol % of hydrogen and argon. Ruthenium powder was obtained. Portion of baked ruthenium was in the form of sintered granules.

Comparative Example 2

The ammonium hexachlororuthenate was prepared by the same process as in Example 1, except that the hydrochloric acid solution containing 50 g/L of ruthenium was held at 70° C. for 6 hours, and that the ammonium chloride was added at 70° C., followed by holding this temperature for 3 hours. The filtered ammonium hexachlororuthenate was in the form of brown paste, and had 21.6% of moisture content.

The resultant ammonium hexachlororuthenate was subjected to the first baking stage as in Example 1. The resultant post baked product was fine black particle granules. This product was disintegrated in a disc mill but was unsuccessful. That is, disintegrated particles dispersed above, while the disc mill clogged. The mechanical disintegration was, therefore, stopped, and he rest of baked product was manually disintegrated. The disintegrated product was then sieved by a sieve having 180 μm of apertures. The coagulated particles were difficult to pass the apertures, while the fine particles fly above the sieve. The weight of the disintegrated product lost in the sieving stage was 400 g in weight. The pulverizing loss in the first stage was 5.7%.

The crude ruthenium, which passed through the 180 μm apertures of the sieve, was again stored in a vessel made of high-purity alumina. Subsequently, the second baking stage was carried out at 900° C. for 2 hours using a tube furnace in a mixed gas atmosphere of 5 Vol % of hydrogen and argon. Ruthenium powder was obtained. However, resultant baked ruthenium from the second stage was in the form of metal-like sintered product of metallic green compact.

The invention claimed is:

1. A method for producing ammonium hexachlororuthenate, $(NH_4)_3RuCl_6$, comprising the steps of:
    adding ammonium chloride to a hydrochloric acid solution containing ruthenium to thereby precipitate ammonium hexachlororuthenate crystals, wherein the hydrochloric acid solution containing ruthenium is held at a temperature of 80 to 95° C. for three hours or longer prior to adding the ammonium chloride, the ammonium chloride is then added to the hydrochloric acid solution containing ruthenium which is stirred by a stirring mill at the rotation of 200 revolutions per minute or more, the hydrochloric acid solution is held at a temperature of from 85 to 95° C. for 1 hour while being stirred at 200 rpm (revolution per minute) or more after adding the ammonium chloride, and
    filtering precipitated ammonium hexachlororuthenate crystals, thereby obtaining crystals of precipitated ammonium hexachlororuthenate having 10 mass % or less of moisture content.

2. A method for producing ruthenium powder, wherein the crystals of precipitated ammonium hexachlororuthenate obtained by the method of claim 1 is baked to obtain crude ruthenium, said crude ruthenium is pulverized and again baked.

3. Crystals of precipitated ammonium hexachlororuthenate wherein the moisture content is 10 mass % of less

* * * * *